(12) United States Patent
Herzberg et al.

(10) Patent No.: US 7,546,275 B1
(45) Date of Patent: Jun. 9, 2009

(54) DECENTRALIZED ELECTRONIC CERTIFIED PAYMENT

(75) Inventors: Amir Herzberg, Ramat Efal (IL); Eldad Shai, Ramat Efal (IL); Ilan Zisser, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1955 days.

(21) Appl. No.: 09/620,732

(22) Filed: Jul. 20, 2000

(51) Int. Cl.
*G06Q 99/00* (2006.01)
(52) U.S. Cl. .............................. 705/50; 705/26; 705/40; 705/64; 713/150
(58) Field of Classification Search ................... 705/26, 705/27, 39, 35, 42–44, 50, 53, 64–79; 715/150, 715/151; 713/176
See application file for complete search history.

(56) References Cited

U.S. PATENT DOCUMENTS

| | | | | |
|---|---|---|---|---|
| 4,405,829 A | | 9/1983 | Rivest et al. ................... 380/30 |
| 5,326,959 A | * | 7/1994 | Perazza ....................... 235/379 |
| 5,390,247 A | * | 2/1995 | Fischer ........................ 713/176 |
| 5,677,905 A | * | 10/1997 | Bigham et al. ......... 370/395.21 |
| 5,677,955 A | * | 10/1997 | Doggett et al. ................. 705/76 |
| 5,809,144 A | * | 9/1998 | Sirbu et al. ..................... 705/53 |
| 5,930,778 A | * | 7/1999 | Geer ............................ 705/45 |
| 6,019,282 A | * | 2/2000 | Thompson et al. .......... 235/379 |
| 6,044,362 A | * | 3/2000 | Neely ........................... 705/34 |
| 6,072,870 A | * | 6/2000 | Nguyen et al. ................. 705/79 |
| 6,078,907 A | * | 6/2000 | Lamm .......................... 705/40 |
| 6,098,053 A | * | 8/2000 | Slater .......................... 705/44 |
| 6,122,625 A | * | 9/2000 | Rosen .......................... 705/65 |
| 6,578,015 B1 | * | 6/2003 | Haseltine et al. .............. 705/34 |
| 6,609,113 B1 | * | 8/2003 | O'Leary et al. ............... 705/39 |
| 6,609,114 B1 | * | 8/2003 | Gressel et al. ................ 705/50 |

FOREIGN PATENT DOCUMENTS

| | | |
|---|---|---|
| EP | 172670 A2 * | 2/1986 |
| EP | 363122 A2 * | 4/1990 |

(Continued)

OTHER PUBLICATIONS

Peterson, S., "Startup adds twist to e-payments," PC Week Online, May 31, 1999, (from http://www.zdnet.com/pcweek/stories/news/).*

(Continued)

*Primary Examiner*—Jalatee Worjloh
(74) *Attorney, Agent, or Firm*—Darby & Darby PC (57) ABSTRACT

A method for deposit of an electronic payment order by a first intermediary processor among a plurality of intermediary processors linked by a communication network. A routing message is received at the first intermediary processor, the message identifying one or more deposit target processors accessible through the network via the second intermediary processor and providing a respective secure identifier for each of the accessible deposit target processors. When the first intermediary processor receives the electronic payment order drawn on a specified one of the deposit target processors conveyed over the network from a depositing processor, it clears the payment order intermediary processor by checking the payment order against the secure identifier of the specified deposit target processor provided in the routing message. Responsive to clearing the order, the first intermediary processor transfers payment to the depositing processor, while conveying the payment order over the network to the specified deposit target.

27 Claims, 6 Drawing Sheets

FOREIGN PATENT DOCUMENTS

| | | | |
|---|---|---|---|
| EP | 385400 | A2 * | 9/1990 |
| EP | 542298 | A2 * | 5/1993 |
| EP | 256768 | B1 * | 3/1994 |
| EP | 363122 | B1 * | 12/1994 |
| GB | 2129181 | A * | 5/1984 |

OTHER PUBLICATIONS

Knudson et al., "Business-to-Business payments and the role of financial electronic data interchange", Federal Reserve Bulleti vol. 80, No. 4, pp. 269-278, Apr. 1994.*

Kutler, "USA: credit/debit ATMs—Home banking—Visa's leap into electronic payment is just the begin", American Banker, p. 1 Aug. 11, 1994.*

Carreker, "Strides in electronic checking transforming payment system", vol. 68, No. 3, pp. 18-30, Mar. 1992.*

Murphy, Electronic check clearing alternative take shape, ABA Banking Journal, vol. 85, No. 5, pp. 62-65, May 1993.*

Deters, Guaranteed checks, Arizona Rpublic, p. 1, Apr. 25, 1994.*

Diamond, Check processing takes a new turn, Computer in Banking, vol. 5, No. 3, pp. 50-55, Mar. 1988.* xByles, More companies are paying bills electronically, Journal of Commerce, p. 2B. May 5, 1988.*

Semper Home Page, http://www.semper.org (web pages), Secure Electronic Marketplace for Europe, pp. 1-3, Jul. 2000.

Asokan, N. et al., "Towards a Framework for Handling Disputes in Payment Systems", in Proceeding of the 3rd. USENIX Workshop on Electronic Commerce (Boston, Aug.-Sep. 1998), pp. 1-23.

* cited by examiner

| DEPOSIT TARGET IDENTITY | PUBLIC KEY | DEBT LIMIT | MIN. LEAD TIME | MAX. CLEAR TIME | VALID TO: | COMMISSION | EXCHG. RATE | MAX. DEPOSIT RESOLN. | CLEAR NEEDED? |
|---|---|---|---|---|---|---|---|---|---|
| PEER 1 | | | | | | | | | |
| PEER 2 | | | | | | | | | |
| PEER 3 | | | | | | | | | |

DECENTRALIZED ELECTRONIC CERTIFIED PAYMENT

FIELD OF THE INVENTION

The present invention relates generally to electronic commerce and transaction processing, and specifically to methods and systems for certified electronic transfer of funds.

BACKGROUND OF THE INVENTION

Existing electronic payment mechanisms require a substantial level of trust among all the participants (typically banks) and require that all of the participants observe common procedures, including fees. The dependence on global trust and procedures is fundamental, for example:

To ensure that payment orders are not submitted multiple times (via different paths).

To ensure authenticity and validity of payment orders.

To provide fair sharing of costs and profits.

Existing mechanisms generally have some technical means designed to address these concerns. For example, credit card systems attempt to detect and discard duplicate credit card charges that are created when a clerk innocently sweeps a magnetic card through a reader multiple times. Such systems also attempt to recognize atypical purchase behavior, such as credit card purchases made in different locations at closely-spaced times, and to require additional authentication or deny such transactions. These mechanisms still depend on trust, for instance, that the clerk did not intentionally sweep the card twice with different amounts. They also require centralized, global control, in order to approve transactions and to identify atypical behavior.

The requirements of common trust, fees and procedures result in rigid, non-competitive mechanisms. For example, in credit card networks, new processors (typically retail vendors) must be audited and approved by the network operator. All processors must rigidly follow the procedures established by the network operator, or risk being unable to collect on a credit card payment that they have received. These are time-consuming, expensive processes. Furthermore, because the entire system is controlled by the network operator, buyers having one brand of credit card cannot buy from sellers who are authorized only to receive another brand.

More traditional payment mechanisms do not use a commercial authority, instead relying on the legal system to provide approval and audit controls. For example, in the United States, a new bank can get a charter, set up a correspondent banking relationship with an existing bank, and immediately start participating in the paper check payment mechanism by issuing and receiving checks. This network of correspondent relationships between banks is known as a clearing network. When a customer of one of the banks deposits a check drawn on another bank in some distant location, the check is routed from one corresponding bank to another until it reaches the bank on which the check is drawn. At this point the check is cleared, and funds are transferred. This mechanism takes advantage of the fact that physical checks cannot be deposited multiple times, as well as on protection afforded by government regulation against bank fraud. The funds are finally credited to the depositor's account only after the check has cleared all of the intermediary banks along the way.

The processing of checks in the banking system is an example of conservative clearing, in which each intermediary clears a payment only after the next intermediary has cleared it. All existing mechanisms for handling electronic payment orders also use conservative clearing, as a trivial solution for prevention of duplicate deposits. Conservative clearing, however, requires common agreement and trust. The only existing clearing mechanisms that do not use conservative clearing are for payments using physical means that cannot be duplicated, such as cash, traveler checks and bank notes, or the electronic equivalent-stored value cards. Banks generally make exceptions to their conservative clearing procedures only for certified checks issued by another bank that they trust.

In recent years, mechanisms have been developed and proposed for enhancing security of electronic transactions. Digital signature methods are described, for example, in U.S. Pat. No. 4,405,829, whose disclosure is incorporated herein by reference. The European Commission has initiated the SEMPER project (Secure Electronic Marketplace for Europe) as a part of its ACTS Program (Advanced Communications Technologies and Services) to develop secure electronic commerce over open networks, especially the Internet. Information regarding SEMPER is available at http://www.semper.org/. One of the issues addressed in the SEMPER framework is the problem of resolving disputed electronic payments, as described, for example, by Asokan et al., in a paper entitled "Towards A Framework for Handling Disputes in Payment Systems," published in the *Proceedings of the 3rd USENIX Workshop on Electronic Commerce* (Boston, August-September 1998), which is incorporated herein by reference. This paper presents a language for expressing dispute claims in a unified manner, and an architecture for resolving such disputes. Claims are supported with evidence tokens, whose use is illustrated in the paper based on an example payment system.

SUMMARY OF THE INVENTION

It is an object of some aspects of the present invention to provide methods and systems for reliable transfer of electronic payment orders with reduced overhead and enhanced flexibility, relative to systems known in the art.

It is a further object of some aspects of the present invention to provide methods and systems for reliable transfer of electronic payment orders that are not dependent on a central organization or on establishment of a relationship of trust among participants.

It is yet a further object of some aspects of the present invention to provide improved methods and systems for reliable transfer of electronic payment orders over open, distributed networks, such as the Internet.

In preferred embodiments of the present invention, a network of payment processors are linked by peer-to-peer agreements, substantially without the need for a centralized organization or control. The agreements provide protocols for automatic transfer of certified electronic payment orders over communication lines between the processors, analogous to clearing of paper checks by transfer from one correspondent bank to another. Unlike the banking system, however, the network of payment processors of the present invention has no need for uniformity in the terms and conditions under which payments are cleared. Rather, each processor is free to set its own terms in its peer-to-peer agreements. A processor, upon receiving a payment order for deposit, routes the order automatically over the network towards the processor on which the order is drawn (equivalent to the bank that issued a particular check) based on its own, independent decision criteria.

The present invention thus creates a system of electronic payment transfer that is flexible and fully open to competition among processors as to their fees and terms of service. It depends neither on government regulation nor on a special relationship of trust among the participants. Rather, reliability is provided by the protocols, including routing and deposit protocols that enable the processors to find the appropriate path through the network for depositing a payment order, and resolution and clearing protocols that allow participants to determine automatically (and immediately) whether a payment order is legitimate and should be honored. These protocols use a secure identifier for each of the participants, to enable the processor receiving an order to clear it with confidence. Preferably, the identifier is based on an electronic signature. Most preferably, the identifier for each processor comprises the public key of its digital signature, as provided by the above-mentioned U.S. Pat. No. 4,405,829, for example.

Preferably, each payment order sent through the network has a "deposit trail." The deposit trail contains the electronic signatures of all of the processors along the route of the payment order, wherein each element in the trail certifies the next one. The deposit trail is used in verifying the legitimacy of payment orders and to resolve conflicts that may occur, such as double deposits (intentional or accidental) of the same payment order. Protocols for automatic conflict resolution are also specified in advance, so that the appropriate payment to be made is determined in substantially all cases without human involvement. It thus becomes possible for network participants to use "optimistic clearing," whereby payment orders are cleared as soon as they are received, rather than waiting for conservative clearing as in systems known in the art. The resolution mechanisms built into the network allow cleared payments to be reversed in the rare case that they are later shown to have been invalid.

There is therefore provided, in accordance with a preferred embodiment of the present invention, a method for deposit of an electronic payment order by a first intermediary processor among a plurality of intermediary processors linked by a communication network, the method including:

receiving at the first intermediary processor a routing message, the message identifying one or more deposit target processors accessible through the network via the second intermediary processor and providing a respective secure identifier for each of the accessible deposit target processors;

receiving at the first intermediary processor the electronic payment order drawn on a specified one of the deposit target processors conveyed over the network from a depositing processor;

clearing the payment order at the first intermediary processor by checking the payment order against the secure identifier of the specified deposit target processor provided in the routing message;

responsive to clearing the order, transferring payment from the first intermediary processor to the depositing processor; and conveying the payment order over the network from the first intermediary processor to the specified deposit target.

Preferably, conveying the payment order includes conveying the order to a second intermediary processor, for conveyance therefrom to the specified deposit target.

Further preferably, the secure identifier includes a public key of a respective electronic signature for each of the deposit target processors.

Most preferably, the plurality of intermediary processors includes the one or more deposit target processors.

Preferably, conveying the payment order includes signing the payment order with an electronic signature of the first intermediary processor, so as to generate a signed deposit trail.

Most preferably, transferring the payment includes transferring the payment to the depositing processor without waiting for a response from the specified deposit target processor to conveyance of the payment order thereto. Further preferably, the method includes receiving at the first intermediary, after clearing the order, an indication from the second intermediary processor that the payment order was not cleared by the specified deposit target processor, and canceling the payment responsive to the indication.

Alternatively, transferring the payment includes transferring the payment after receiving an indication from the second intermediary processor that the payment order has been cleared.

Preferably, conveying the signed payment order includes selecting the second intermediary processor to which the payment order is conveyed from among a plurality of intermediary processors available to convey the payment order over the network to the deposit target. In a preferred embodiment, conveying the payment order includes conveying the order via an electronic post office within a specified time limit, which post office returns to the first intermediary processor a certification that the order was conveyed to the second intermediary processor within the specified time limit.

There is also provided, in accordance with a preferred embodiment of the present invention, a method for carrying out an electronic transaction between first and second processors linked by a communication network, the transaction having a time limit associated therewith, the method including:

sending an electronic payment order over the network within the time limit from the first processor to an electronic post office, for conveyance of the order from the post office to the second processor, responsive to which order the second processor is required to transfer payment to the first processor; and receiving at the first processor a certification from the post office that the message was conveyed to the second processor within the time limit.

Preferably, sending the order to the post office includes sending the order to multiple post offices, thereby providing robust delivery of the order in the event of a failure associated with one or more of the post offices.

There is additionally provided, in accordance with a preferred embodiment of the present invention, a method for carrying out an electronic transaction between first and second processors linked by a communication network, the transaction having a time limit associated therewith, the method including:

transmitting a message directly from the first processor to the second processor;

awaiting an acknowledgment from the second processor that the message was received within the time limit;

responsive to a failure of the second processor to provide the acknowledgment, sending a message over the network within the time limit from the first processor to an electronic post office, for conveyance of the message from the post office to the second processor; and receiving at the first processor a certification from the post office that the message was conveyed to the second processor within the time limit.

There is further provided, in accordance with a preferred embodiment of the present invention, a method for deposit of an electronic payment order drawn on a deposit target processor, including:

receiving the electronic payment order at a first intermediary processor over a network from a depositing processor;

signing the payment order with an electronic signature of the first intermediary processor;

conveying the signed payment order over the network from the first intermediary processor to at least a second intermediary processor, for conveyance of the payment order from the second intermediary processor over the network to the deposit target; and transferring payment from the first intermediary processor to the depositing processor responsive to the payment order.

Preferably, conveying the signed payment order includes adding to the signed payment order an electronic signature of at least the second intermediary processor so as to generate a signed deposit trail. Further preferably, the method includes verifying validity of the payment order responsive to the signed deposit trail, wherein verifying the validity of the payment order includes, when two or more duplicates of the payment order are received at one of the processors, determining which of the copies is valid responsive to the signed deposit trail. Most preferably, determining which of the duplicates is valid includes determining whether the duplicates were generated accidentally due to a communication failure.

Additionally or alternatively, determining which of the copies is valid includes requesting that each of the processors that conveyed one of the two or more duplicates of the payment order provide the signed deposit trail for the respective duplicate, and clearing or canceling each of the duplicates responsive to the deposit trails provided. Further preferably, requesting that each of the processors provide the signed deposit trail includes requiring that the processors provide the deposit trail within a specified time limit. Most preferably, requiring the processors provide the deposit trail within the specified time limit includes transmitting a communication via an electronic post office within the specified time limit, whereby the post office returns a certification that the communication was conveyed within the specified time limit. Preferably, verifying the validity of the payment order includes clearing the order only if the deposit trail includes the electronic signatures of all of the intermediary processors that have conveyed the order.

In a preferred embodiment, signing the payment order includes grouping the payment order with other payment orders to be conveyed to the same deposit target processor, and applying a single signature to the grouped payment orders.

Preferably, conveying the signed payment order includes awaiting an acknowledgment for a predetermined length of time after conveying the payment order to the second intermediary processor and, if the acknowledgment is not received, conveying the signed payment order to a third intermediary processor for conveyance of the payment order from the third intermediary processor over the network to the deposit target. Further preferably, conveying the signed payment order to the third intermediary processor includes adding to the payment order an indication by the first intermediary processor that it has conveyed the payment order twice, whereby the deposit target processor is able to resolve duplicates of the payment order received via the second and third intermediary processors.

There is moreover provided, in accordance with a preferred embodiment of the present invention, a method for deposit of an electronic payment order drawn on a deposit target processor, including:

receiving the electronic payment order at a first intermediary processor over a network from a depositing processor;

conveying the signed payment order over the network from the first intermediary processor to a selected one of a plurality of available intermediary processors, for conveyance of the payment order by the selected intermediary processor over the network to the deposit target; and transferring payment from the first intermediary processor to the depositing processor responsive to the payment order.

Preferably, conveying the signed payment order includes receiving notifications from the plurality of available intermediary processors indicative of different transaction terms respectively offered by the available intermediary processors to the first intermediary processor, and selecting the intermediary processor to which to convey the order responsive to the offered terms. Most preferably, the offered terms include rates at which the available intermediary processors are to be compensated for conveyance of the payment order. Additionally or alternatively, the offered terms include lengths of time required by the available intermediary processors for processing of the payment order and/or maximal outstanding debt limits offered by the available intermediary processors to the first intermediary processor.

Further preferably, the deposit target processor is one of a plurality of deposit target processors accessible via the network, and the offered terms include different terms specific to each of the deposit targets. Most preferably, receiving the notifications includes receiving a routing message from each of the plurality of intermediary processors indicating the deposit targets through the intermediary processor and the specific terms respective to each of the deposit targets. Additionally or alternatively, receiving the notifications includes receiving messages from different ones of the available intermediate processors intermittently, altering the transaction terms offered to the first intermediary processor.

Preferably, conveying the signed payment order includes conveying the order in accordance with peer-to-peer contracts between the first intermediary processor and each of the plurality of available intermediary processors, specifying terms under which the payment order is to be conveyed. Most preferably, the peer-to-peer contracts are negotiated between the intermediary processors, such that a new intermediary processor is able to join the network substantially without prior audit by a central authority.

There is furthermore provided, in accordance with a preferred embodiment of the present invention, an intermediary processor for electronic transactions, operative among a plurality of such intermediary processors linked by a communication network, which intermediary processor is adapted to receive a routing message from another one of the intermediary processors, the message identifying one or more deposit target processors accessible through the network via the other intermediary processor and providing a respective secure identifier for each of the accessible deposit target processors, such that upon receiving an electronic payment order drawn on a specified one of the deposit target processors and conveyed over the network from a depositing processor, the intermediary processor clears the payment order at the first intermediary processor by checking the payment order against the secure identifier of the specified deposit target processor provided in the routing message and, responsive to clearing the order, to transfer payment to the depositing processor and to convey the payment order over the network to the specified deposit target processor.

There is additionally provided, in accordance with a preferred embodiment of the present invention transaction processor, linked to a communication network and adapted to carry out an electronic transaction with another processor linked to the network, the transaction having a time limit associated therewith, by sending an electronic payment order over the network within the time limit to an electronic post office, for conveyance of the payment order from the post office to the second processor, responsive to which payment order the second processor is required to transfer payment to the first processor, and receiving a certification from the post office that the message was conveyed to the other processor within the time limit.

There is also provided, in accordance with a preferred embodiment of the present invention, an electronic transaction processor, which is adapted to receive an electronic payment order drawn on a deposit target processor conveyed over a network from a depositing processor, to sign the payment order with an electronic signature, to convey the signed payment order over the network to at least one intermediary processor, for conveyance of the payment order from the intermediary processor over the network to the deposit target, and to transfer payment to the depositing processor responsive to the payment order.

There is further provided, in accordance with a preferred embodiment of the present invention, an electronic transaction processor, which is adapted to receive an electronic payment order drawn on a deposit target processor conveyed over a network from a depositing processor, to convey the signed payment order over the network to a selected one of a plurality of available intermediary processors, for conveyance of the payment order by the selected intermediary processor over the network to the deposit target, and to transfer payment to the depositing processor responsive to the payment order.

There is moreover provided, in accordance with a preferred embodiment of the present invention, a system for decentralized electronic transaction processing, including a group of processors, mutually linked via a network, the processors in the group including at least:

a deposit target processor, on which an electronic payment order is drawn;

a depositing processor, which receives the electronic payment order over the network; and a plurality of intermediary processors, each such intermediary processor adapted to receive a routing message from another one of the intermediary processors, the message providing a secure identifier for the deposit target processor, such that upon receiving the electronic payment order from the depositing processor, the receiving intermediary processor clears the payment order by checking the payment order against the secure identifier provided in the routing message and, responsive to clearing the order, transfers payment to the depositing processor and conveys the payment order over the network to the deposit target processor.

There is furthermore provided, in accordance with a preferred embodiment of the present invention, a system for decentralized electronic transaction processing, including a group of processors, mutually linked via a network, the processors in the group including at least:

first and second transaction processors, adapted to carry out an electronic transaction via the network, the transaction having a time limit associated therewith; and an electronic post office, adapted to receive an electronic payment order associated with the transaction from the first processor and to convey the order to the second processor, responsive to which order the second processor is required to transfer payment to the first processor, while the post office provides to the first processor a certification that the message was conveyed to the other processor within the time limit.

In still another preferred embodiment of the present invention, there is provided a system for decentralized electronic transaction processing, including a group of processors, mutually linked via a network, the processors in the group including at least:

a deposit target processor, on which an electronic payment order is drawn;

a depositing processor, which receives the electronic payment order over the network; and at least one intermediary processor, adapted to receive the electronic payment order over the network from the depositing processor, to sign the payment order with an electronic signature of the intermediary processor, to convey the signed payment order over the network to the deposit target processor, and to transfer payment to the depositing processor responsive to the payment order.

In yet another preferred embodiment of the present invention, there is provided a system for decentralized electronic transaction processing, including a group of processors, mutually linked via a network, the processors in the group including at least:

a deposit target processor, on which an electronic payment order is drawn;

a depositing processor, which receives the electronic payment order over the network; and a plurality of intermediary processor, adapted to receive the electronic payment order over the network from the depositing processor, one of which is selected by the depositing processor for conveyance of the payment order by the selected intermediary processor over the network to the deposit target and to transfer payment to the depositing processor responsive to the payment order.

There is also provided, in accordance with a preferred embodiment of the present invention, a computer software product, including a computer-readable medium in which program instructions are stored, which instructions, when read by a computer, cause the computer to accept a routing message from an intermediary processor, the message identifying one or more deposit target processors accessible through the network via the intermediary processor and providing a respective secure identifier for each of the accessible deposit target processors, such that when the computer receives an electronic payment order drawn on a specified one of the deposit target processors conveyed over the network from a depositing processor, the instructions further cause the computer to clear the payment order by checking the payment order against the secure identifier of the specified deposit target processor provided in the routing message, and responsive to clearing the order, to transfer payment to the depositing processor and to convey the payment order over the network to the specified deposit target.

There is additionally provided, in accordance with a preferred embodiment of the present invention, a computer software product, including a computer-readable medium in which program instructions are stored, which instructions, when read by a first computer, cause the first computer to carry out a transaction with a second computer via a network, the transaction having a time limit associated therewith, by sending an electronic payment order over the network to an electronic post office, for conveyance of the order from the post office to the second computer, responsive to which order the second computer is required to transfer payment to the first computer, and by receiving a certification from the post office that the message was conveyed to the second computer within the time limit.

There is further provided, in accordance with a preferred embodiment of the present invention, a computer software product, including a computer-readable medium in which program instructions are stored, which instructions, when read by a computer, cause the computer to receive an electronic payment order drawn on a deposit target processor conveyed over a network from a depositing processor, to sign the payment order with an electronic signature, to convey the signed payment order over the network to an intermediary processor for conveyance of the payment order from the intermediary processor over the network to the deposit target, and to cause payment to be transferred to the depositing processor responsive to the payment order.

There is moreover provided, in accordance with a preferred embodiment of the present invention, a computer software product, including a computer-readable medium in which program instructions are stored, which instructions, when read by a computer, cause the computer to receive an electronic payment order drawn on a deposit target processor conveyed over a network from a depositing processor, to convey the signed payment order over the network from the first intermediary processor to a selected one of a plurality of available intermediary processors, for conveyance of the payment order by the selected intermediary processor over the network to the deposit target, and to cause payment to be transferred from the first intermediary processor to the depositing processor responsive to the payment order.

The present invention will be more fully understood from the following detailed description of the preferred embodiments thereof, taken together with the drawings in which:

DETAILED DESCRIPTION OF PREFERRED EMBODIMENTS

Figure 1:
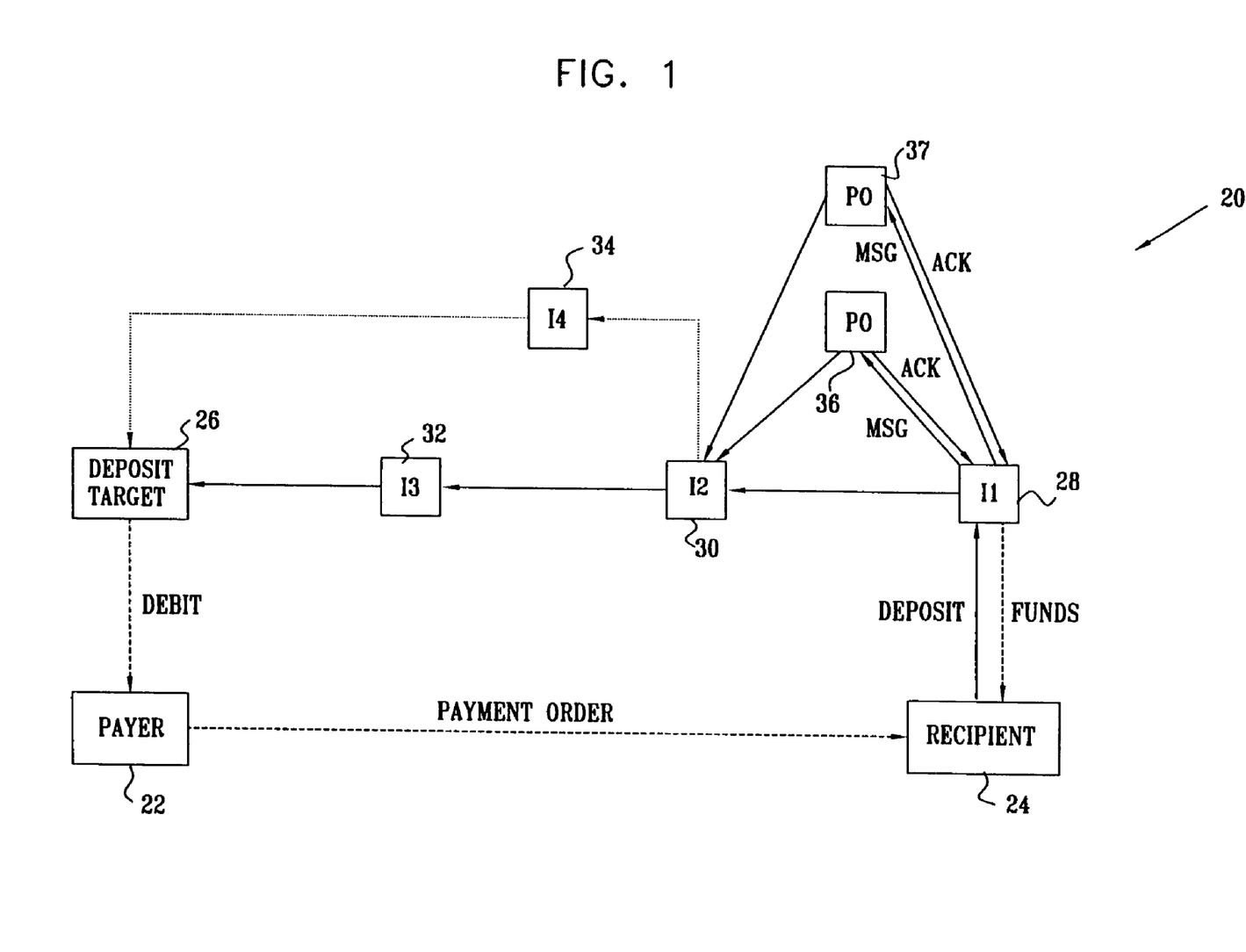
FIG. 1 is a block diagram that schematically illustrates a network for processing of electronic payment orders, in accordance with a preferred embodiment of the present invention.

FIG. 1 is a block diagram that schematically illustrates a network 20 for processing of electronic payment orders, in accordance with a preferred embodiment of the present invention. A payer 22 conveys a payment order to a recipient 24, to whom the payer owes money (by virtue of having made a purchase, for example). The payment order is drawn on a network participant, identified as a deposit target 26, with whom the payer has a suitable credit or debit account. In traditional banking systems, the payment order typically takes the form of a check, and the deposit target is a bank. In network 20, however, the payment order is preferably a certified electronic payment order, which is signed with an authorized digital signature of payer 22 and/or of deposit target 26.

Recipient 24 deposits the payment order and in return receives funds or credit in the amount specified by the order. Although it may be possible in some cases for the recipient to deposit the order directly with deposit target 26, most commonly the recipient will deposit the payment order with an intermediary 28 (labeled I1 in the figure) with whom the recipient has an account or a deposit relationship. This intermediary may pass the order directly to the deposit target, or it may convey it through further intermediaries 30 and 32 until it reaches the target. (The intermediary may also pass the order to the next intermediary in the chain as a "certified message," through an electronic post office 36, as described further hereinbelow.) At each stage along the chain, beginning with recipient 24 and up to deposit target 26, the payment order is preferably checked in accordance with predefined protocols, as described hereinbelow, to verify that it is valid and has been properly submitted within a specified time limit. The exchange of the payment order for credit or funds transfer takes place according to the appropriate protocols at each stage of the chain until the order has been finally cleared by all of the participants involved.

Recipient 24, deposit target 26 and intermediaries 28, 30, 32 and 34 are all referred to hereinafter as network participants. All of the participants in network 20 preferably have substantially equal standing, without a hierarchical structure or central control. Therefore, the participants are also referred to as "peers." Each participant comprises a processor, which communicates and interacts automatically with the other processors in the network in accordance with the protocols described below. In addition, each of the processors has a management interface, enabling an operator of the processor to define the terms and conditions under which that processor will contract and exchange payment orders and funds with its peers. Typically, the processors comprise general-purpose computers, linked by a communication network of any suitable type known in the art, such as the Internet, an Asynchronous Transfer Mode (ATM) network, a public switched telephone network (PSTN), a wireless network or a combination of two or more of these network types. The computers carry out the functions described herein under the control of suitable software, which may be downloaded to the computers over the communication network or, alternatively, may be supplied to the computers on tangible media, such as CD-ROM or non-volatile memory.

Deposit arrangements using a chain of trusted intermediaries, similar in some ways that shown in FIG. 1, are used in existing banking and other billing and payment systems. As noted above, these existing systems are predicated on central control of the system and/or on an institutionalized relationship of trust among the participants. Routing of deposits in such systems is generally fixed, and any deviations from the fixed routing or other procedures requires human involvement. By contrast, network 20 is based on peer-to-peer relationships among the participants, without central control or regulation. Each participant is free to decide dynamically, preferably without direct human involvement, how to handle each payment order that it receives. Therefore, network 20 has protocols and automatic procedures for handling the following needs:

1. Routing: determining whether and how to deposit payment orders drawn on a given deposit target. When recipient 24 receives a payment order certified by a deposit target 26, it needs to know whether there is a path of intermediaries leading to this deposit target such that this order may be deposited and cleared through this path. Furthermore, if multiple paths exist, it needs to know which of them to use. This information is provided in a dynamic environment, in which participants may join and leave, and trust relationships may change.

2. Motivating intermediaries: Clearly, intermediaries 28, 30 and 32 should be compensated for their services, by a commission (surcharge) paid by deposit target 26 and/or recipient 24. In traditional banking and payment systems, these commissions are generally fixed by a central authority. Participants in network 20 are free to set their own commissions and to change them at will.

3. Handling uncleared payment orders. There is a tradeoff between minimizing the time to clear a payment and the need to limit the risk of not receiving the funds for it. When making a deposit, it is desirable to minimize the delay until the payment is cleared (whereupon the depositor can deliver the goods and services). If an intermediary, say I1, clears a payment order before it was cleared by I2, however, then I1 is taking a risk that I2 may never clear the payment and deliver the funds to I1. Such non-payment could be due to a fraud or failure by I2, a fraud or failure by the deposit target, or detection by either I2 or the deposit target that the payment order is invalid (expired, not properly authorized, or double-deposited).

4. Preventing double-deposit of payment orders: In the scenario illustrated in FIG. 1, intermediary 30 (I2) can deposit the payment order via either intermediary 32 (I3) or intermediary 34 (I4). When the payment order is not a physical object, such as a paper check, it may be possible for I2 to deposit the same payment order through both I3 and I4, either accidentally or intentionally. Deposit target 26 detects this duplication and pays (clears) at most once. The protocols operative in network 20 enable both I3 and I4 to determine which of them should have carried out the transaction, and which should seek recompense from I2. The protocols also enable network participants to determine whether a double deposit was accidental or intentional, and to punish the offender in the case of intentional double deposit. Deposit target 26 (and other network participants) is able to detect "theft" of payment orders, as might occur if I4 eavesdrops on communications between I2 and I3 and deposits a duplicate payment order with the deposit target.

5. Finality of certified payments: Recipient 24, as well as each of the intermediaries along the path to deposit target 26, is able to determine locally whether the payment order is valid immediately upon receiving it. If a valid certified payment order is properly deposited on time, then it will be cleared at every step along the path, and the recipient will receive the funds. Network 20 thus provides mechanisms that enable the intermediaries, under appropriate circumstances that they may themselves determine, to clear payment orders optimistically, i.e., without waiting to receive clearance from all of the downstream intermediaries. The network protocols allow the intermediaries to recover the funds delivered if the payment is subsequently not cleared by another participant further down the chain.

The set of protocols carried out by the participant processors, designed to meet the needs outlined above, includes (but is not necessarily limited to) the following:

Contract protocol, whereby two peers agree on the terms of their relationship.

Routing protocol, whereby each processor $P_i$ sends routing messages to its peers, telling them under what terms the peers may convey payment orders for deposit to other processors via $P_i$. The routing protocol is preferably initiated by $P_i$, typically periodically. Alternatively or additionally, the peers of $P_i$ may request the routing message. The request is typically associated with a specific demand, such as increasing the maximal outstanding debt allowed for a particular processor.

Deposit protocol, whereby a processor sends to a peer payment orders for deposit, via the peer, with different processors (possibly including the peer itself). This protocol handles only the deposit of the payment order and the immediate response (acknowledge or rejection). It is similar in this respect to the deposit mechanisms of existing electronic funds transfer systems.

Resolution protocol, whereby a processor asks a peer for additional details required to resolve a problem during deposit of a payment order, typically to resolve a double deposit due to error or fraud.

Clear/cancel protocol, whereby a processor informs a peer of the outcome of a deposit: clearing of the payment (OK) or cancellation due to a problem such as double deposit.

Secure transmission (forwarding) protocol, used whenever a processor wants proof of the fact that it sent a message to a peer at a specific time.

Payment notification protocol, used to request or send acknowledgments of received payments.

Termination protocol, used to terminate the relationship with a peer.

Judgment protocol, used when a processor claims that a peer has failed to follow the correct protocol. The processor will send a special judgment message to other peers running a judgment process, which will then reply with their decision. A solution of this type is proposed in the above-mentioned article by Asokan et al.

Figure 4:
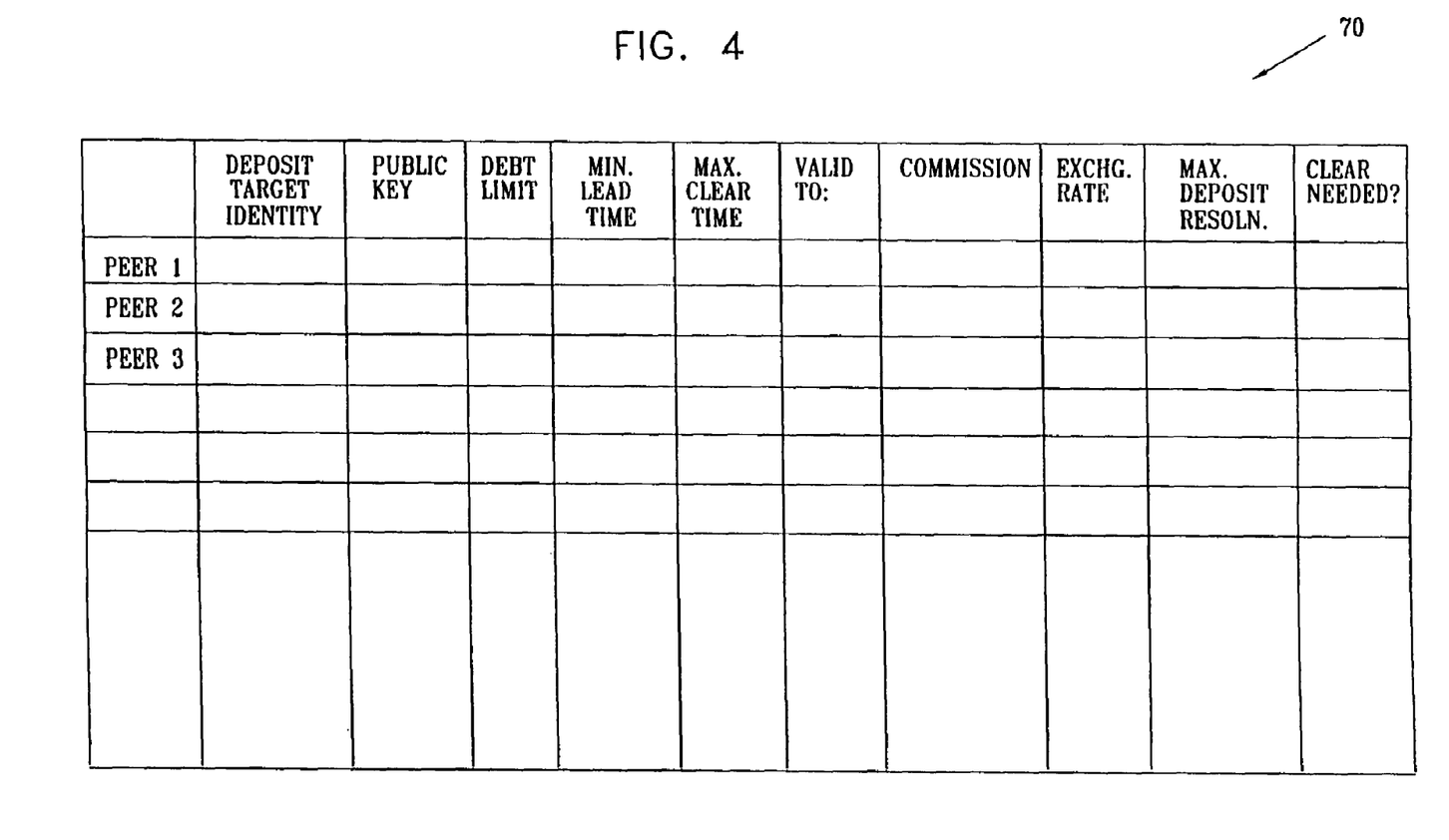
FIG. 4 is a schematic representation of a routing table used by payment processors in depositing payment orders, in accordance with a preferred embodiment of the present invention.

Each processor carries out the protocols in accordance with peer relationship information that the processor receives through the management interface. Some of this information is illustrated in FIG. 4 and is described hereinbelow with reference thereto. The management interface is also used to inform the processor whenever an actual payment, i.e., a transfer of funds, is received from or delivered to one of its peers.

Figure 2:
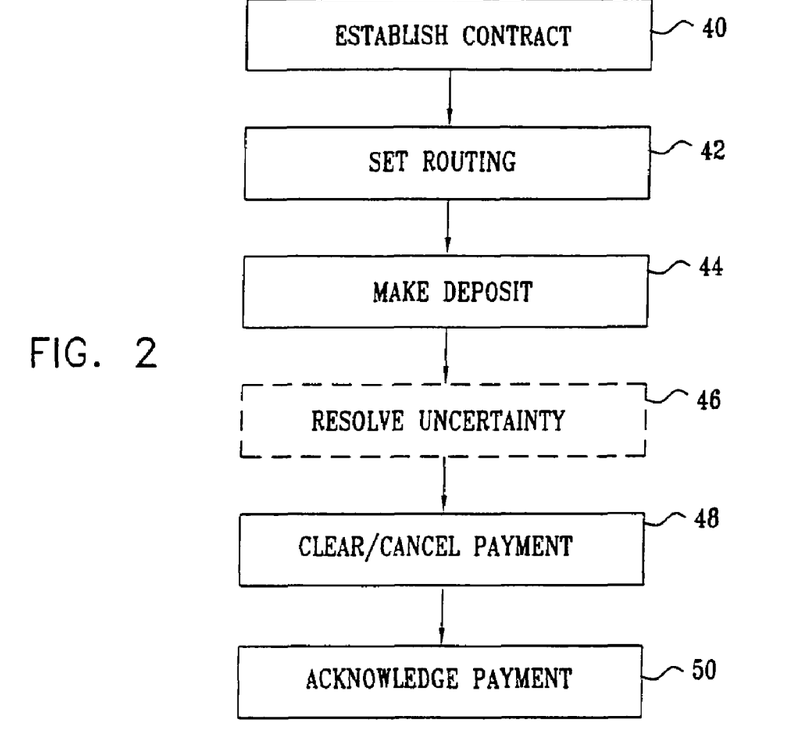
FIG. 2 is a flow chart that schematically illustrates a method for transferring payments in the network of FIG. 1.

FIG. 2 is a flow chart that schematically illustrates a process for carrying out payment transactions in network 20, in accordance with a preferred embodiment of the present invention. This process includes elements of a number of the protocols mentioned above. Further details of these protocols are described below with reference to FIGS. 3-7. All of the protocols preferably use an appropriate secure transmission (forwarding) mechanism, providing acceptable proof of transmission, as defined in the contract between the two parties. Most preferably, messages are signed by the sender, time-stamped (by the sender and/or third parties), and encrypted so that only the intended recipient can read them. These operations may be carried out using any suitable method known in the art, and are not always mandatory.

Relations between participants in network 20 begin with establishment of contracts between pairs of participants in accordance with the contract protocol, at a contracting step 40. Each contract defines the terms of the relationship between a particular pair of participants. Contract terms may differ among different pairs of participants, and even among contracts made by one participant with different peers or with the same peer at different times or under different circumstances. At a routing step 42, the participants exchange information using the routing protocol, informing each other of the terms under which they will receive deposit of payment orders targeted to other participants.

Once the contract and routing information is in place, any participant can make a deposit, at a deposit step 44, with any peer with which the participant has contractual relations. The deposit is carried out in accordance with the deposit protocol. Ordinarily, it is expected that the payment order will be conveyed and cleared without further action on the part of the depositing participant. On occasion, however, some uncertainty or irregularity may occur, due to a double deposit, for example. In this case, the participant that received the questionable payment order typically requests further information from the depositing participant in order to resolve the uncertainty, at a resolution step 46. The request and response are made in accordance with the resolution protocol.

At a clearing step 48, the participant receiving the payment order notifies the participant that made the deposit that the payment has been cleared, in accordance with the clear/cancel protocol, or alternatively that the payment has been cancelled due to some irregularity, such as a double deposit. Other reasons for canceling a payment may include lack of proper signature, time expired, maximum outstanding debt exceeded, overriding of the deposit by another retry deposit, or timeout, i.e., failure to respond in time to resolution request. If a payment is cancelled, proof of the irregularity that led to the cancellation (typically provided by the resolution protocol) is preferably included in the cancellation message. Cancellation or clearing must be done within the maximal time allowed for clearing or canceling a deposit, as indicated in the routing table.

Finally, after the payment is cleared, the actual transfer of funds or credit is made. The participant processor is informed through its management interface that the transfer has been made. At an acknowledgment step 50, the participant making the transfer uses the payment notification protocol to request a signed acknowledgment of the transfer from the peer that received the payment. If the peer does not provide the expected acknowledgment, the processor sends out an operator alert over its management interface.

Figure 3:
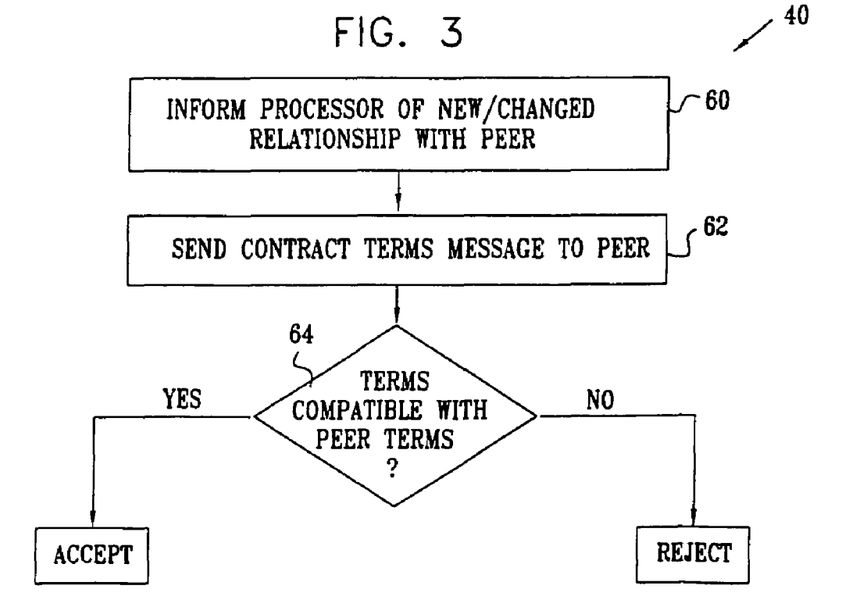
FIG. 3 is a flow chart that schematically illustrates a method for establishment of a contract between payment processors, in accordance with a preferred embodiment of the present invention.

FIG. 3 is a flow chart that schematically illustrates details of contracting step 40, in accordance with a preferred embodiment of the present invention. Under the contract protocol, two peers agree on the terms of their relationship in order to avoid any subsequent misunderstandings. A processor invokes this protocol, at a new relationship information step 60, when the processor is informed through its management interface of a new peer relationship or of a change in the terms of an existing relationship. The protocol sends the terms of the relationship to the peer processor in a contract terms message, at a messaging step 62. Upon receiving such a contract terms message, the peer processor assesses the proposed terms at a compatibility assessment step 64. The peer replies with approval or rejection, based on the compatibility of the terms of the contract with terms received from its own management interface.

The terms to be communicated and agreed upon include a contract identifier; the currency to be used between the two peers; the validity period for the contract; and definition of acceptable proof of transmission (as defined below) and an acceptable judgment process. The acceptable judgment process defines how the two parties agree to resolve disputes, for example, by listing the identities of entities that are trusted by both parties to arbitrate disputes, or by specifying that any party may act as judge and make the appropriate decisions for itself. Additional terms may include, for instance, default commissions and currency conversion rates, as well as maximal liability assumed by each party towards the other. Technical limits between the two parties may be communicated as well, such as a limit on the maximal message size.

Proof of transmission is necessary in order to resolve conflicts between the two peers as to whether a given message was sent from one to the other at a specific time, and who is to blame for a communication failure between them. The simplest possible definition of acceptable proof is simply the inclusion of the transmission time (according to the sender) in the message. This definition, however, requires complete trust in the sender, so that the sender cannot cheat by claiming to have sent a message without actually having sent it. An alternative definition puts the risk on the sender, by requiring the signature of the receiver on the message after it was received, including a time-stamp from either the sender or receiver (or both).

A more secure proof of transmission involves third parties, called post offices, who perform secure forwarding services. Post offices 36 and 37 are shown in FIG. 1 to illustrate this function. When one of the post offices receives a message from intermediary 28 (I1), it attempts to forward the message to its destination, in this case intermediary 30 (I2), while providing I1 with signed proof of the time of receipt of the message. This service is similar to certification of mail by a post office. The definition of acceptable proof of transmission in the contract may allow multiple alternatives, including a number of acceptable post offices, or may require forwarding through multiple post offices, or still more complex arrangements. Preferably, to avoid excessive use of post office services, the sending processor first sends its message directly to the receiving processor and awaits a suitable acknowledgment. If the acknowledgment is not received or is defective, the sending processor resends the message through the post office. Optionally, I1 sends the message to multiple post offices 36 and 37, simultaneously or serially, in order to ensure that the message reaches its destination in time and that I1 receives the desired proof of transmission.

Multiple contracts may even be agreed upon between the same two peers. For example, the peers may use multiple contracts if they wish to keep accounts in multiple currencies between them, or to allow overlap between a new contract and the previous contract.

FIG. 4 is a schematic representation of a routing table 70 maintained by processors in network 20, in accordance with a preferred embodiment of the present invention. The table is used by each processor to keep track of the terms under which payment orders may be deposited with various different peers in the network. The information recorded in the table is exchanged by the processors using the routing protocol. This protocol may be initiated by any one of the processors periodically, in order to inform its peers of a change in its deposit terms. Additionally or alternatively, the information may be furnished in response to a request from one of the peers. Such a request is typically made in connection with a particular demand by the peer, such as for an increase in the maximum outstanding debt allowed for a certain deposit target.

The routing protocol preferably uses the following messages:

1. Routing_request (demand) message, whereby a processor asks its peer to provide routing information or updates, as specified in table 70. An optional demand field indicates the specific routing information required, such as a request for routing to a particular deposit target, or for an increase in the maximum outstanding debt allowed for a deposit target.

2. Routing_information (routing table) message, whereby a processor provides routing information to a peer.
3. Routing information acknowledgment message, indicating acceptance of routing information.

As shown in FIG. 4, every row of routing table 70 identifies the peer to whom the row corresponds and contains a list of parameters, such as:
Deposit target identity and public key.
Maximal outstanding debt allowed.
Minimal lead time for deposits.
Maximal time for clearing or canceling a deposit.
Validity period for this row.
Commissions.
Exchange rates.
Maximal deposit resolution time (maximum time for the depositor to provide the detailed proof of deposit, if requested by the resolution protocol).

Additional parameters in the table may include technical restrictions to ensure interoperability, such as type and maximal length of messages (e.g. deposit), versions supported, etc. The table may also indicate whether payments need to be cleared, or if the payment is considered completed immediately upon a successful deposit (and only cancelled later if a problem is resolved). Multiple rows may be used for the same deposit target, so as to support different contracts (for different currencies, for example), or to allow continuity while changing the routing terms. The routing information or table may also include indication of participants to which routing is disabled.

Figure 5:
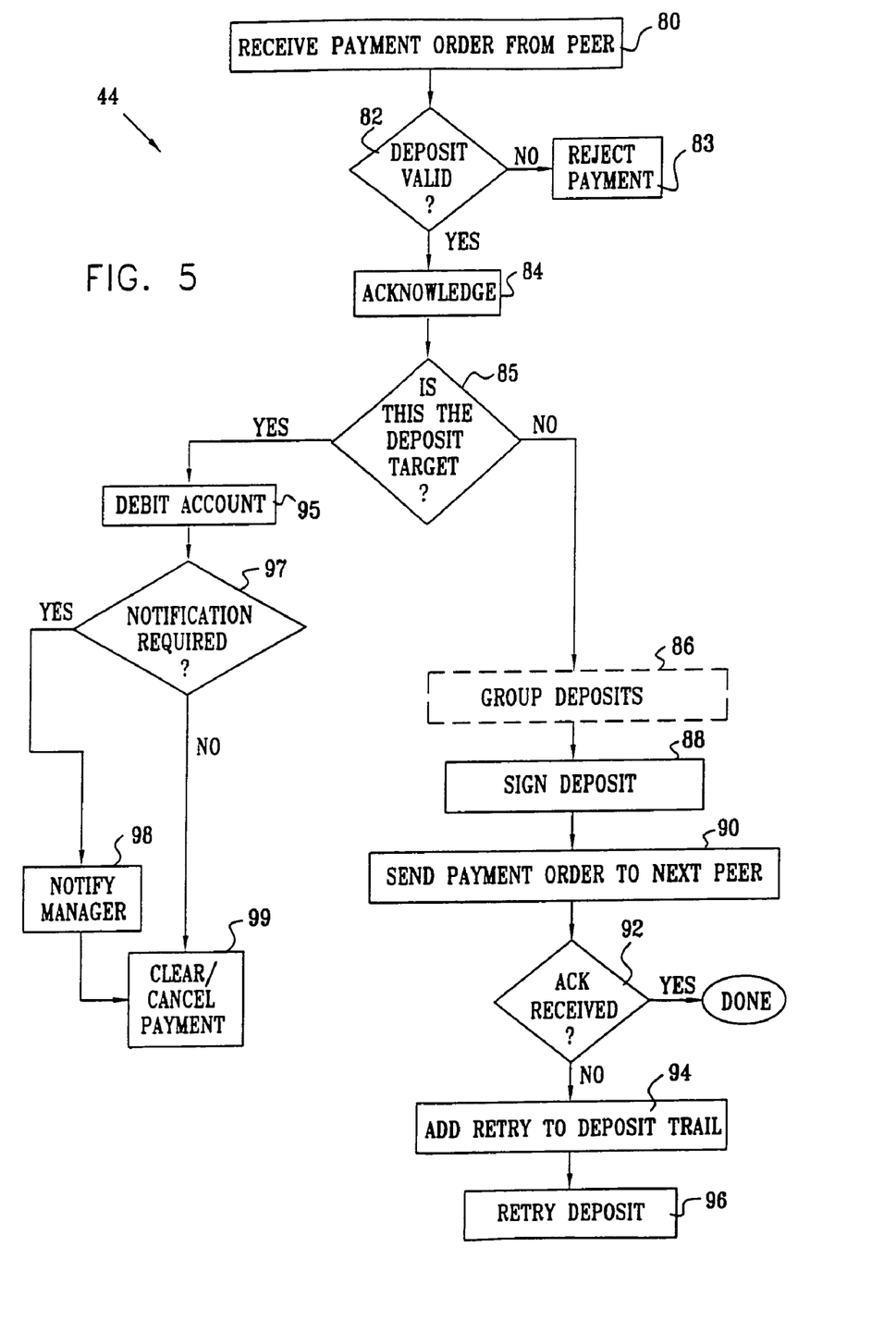
FIG. 5 is a flow chart that schematically illustrates a method for processing a payment order received for deposit from a payment processor, in accordance with a preferred embodiment of the present invention.

FIG. 5 is a flow chart that schematically illustrates details of deposit step 44, using the deposit protocol, in accordance with a preferred embodiment of the present invention. The deposit protocol is used when a given processor $P_j$ sends to a peer $P_i$ payment orders to be deposited, via $P_i$, at one or more deposit target processors (possibly including $P_i$ itself). This protocol handles only the deposit of the payment order and the immediate response (acknowledge or rejection).

Peer $P_i$ receives the payment order from $P_j$ at a deposit receipt step 80. Preferably, $P_i$ performs all possible local checks on the deposit to verify that it is acceptable, at a validity-checking step 82. These checks preferably include ascertaining that all the signatures are valid and that the time to deposit has not elapsed (adding the minimum lead time for deposits as agreed in the routing message between the two peers). If there is a problem, peer $P_i$ immediately rejects the payment, at a payment rejection step 83, and is therefore able to prove its honesty. Optionally, at least some of these checks are made only on random sampling basis if the overhead of performing them is problematic. In this case, the resolution protocol is needed in order to handle invalid payment orders that were not caught by random sampling.

If the payment order is considered valid, peer $P_i$ acknowledges its receipt, at an acknowledgment step 84. From this point on, handling of the order differs depending on whether or not this peer is the deposit target 26, as determined at a target decision step 85. For the deposit target, the protocol continues at a debit step 95, described below. Otherwise, the peer must pass the payment order on to the next peer along the deposit path. The deposit protocol may deposit each payment order in a separate message. Preferably, however, the peer receiving the deposit, $P_i$, groups and sends out collections of payment order messages, at a deposit-grouping step 86.

Each payment order is preferably accompanied by its deposit trail, providing details on the path of intermediaries that this deposit message followed up to the current deposit. A signed deposit trail is one that contains the electronic signature of every depositor on the payment order and the identity of the processor to which the deposit is currently being submitted. If all deposit messages include such a signed deposit trail, detection of doubly-deposited payment orders becomes trivial. The party receiving the two deposits simply compares the trails to find the identity of the party that deposited the order twice. Moreover, since each party on the path can verify the first link in the trail (the buyer's bank), when receiving the deposit, it can verify locally and immediately that the whole trail deposit is valid.

Signed deposit trails, however, require every processor to sign each individual payment order that it passes, at a signature step 88. The deposit trail may also become very long by the time the payment order reaches the deposit target. These factors may result in substantial processing and storage overhead, motivating an unsigned deposit trail. In the absence of a signed deposit trail, security is preferably based on a signature attached to an entire batch of deposits, used only between the depositing processor and its peer. The signature must still be on the payment order, along with the identity of the processor to which the deposit is currently being submitted. This signature can be used later to prove the honesty of the peer when double deposits are found, and to help in tracking an offending processor and in preventing theft of deposits. When there is no signed deposit trail, and resolution is non-trivial, the resolution protocol is preferably used, at step 46 (FIG. 2) to provide provable resolution of double deposits and other uncertainties. Once a provable resolution of the double deposit is available, the clear/cancel protocol is used, at step 48, to cancel at least one path of the double deposit securely.

It is possible that the peer will require the depositor to divide the deposit into smaller elements, wherein each element is hashed separately, and all of them signed together. In this way, the peer will be able to reveal only the relevant details of the deposit during the resolution protocol, rather than all of the deposit information.

It is also possible to use a variation of the deposit trail which allows some level of batching, i.e. signing multiple deposit orders together. In this case, processors preferably collect and sign as a group deposits that are destined for the same deposit target. When a payment order travels downstream toward the deposit target, collections of deposits from different recipients to the same deposit target are preferably merged into bigger and bigger collections that are signed and deposited together. Such deposit messages may become long, and cannot broken into smaller pieces. For this reason, there is preferably a maximal message length specified in the contract and routing messages.

Thus, peer $P_i$, after receiving, validating and, as appropriate, grouping and signing the payment order, passes the order on to the next peer in the chain, or to the deposit target itself, at a sending step 90. Once the next peer acknowledges the order, at an acknowledgment receipt step 92, the deposit protocol is completed with respect to this particular order. It may occur, however, that no acknowledgment is received within the maximum clear time. Such a failure to acknowledge may be due to a communication fault or a malfunction by the next peer. In such a case, peer $P_i$ must retry the deposit, possibly via another peer.

A retried deposit may result in unintentional duplication of the payment order. This situation is illustrated in FIG. 1. Suppose I2 deposits a payment order with I3, and I3 receives the deposit and proceeds with it. If communications then fail between I3 and I2, then I2 is left uncertain as to whether I3 received the deposit or not. A similar scenario may happen, at least in theory, even if I2 communicates to I3 via a forwarding post office, if the communication failure happens between I2 and the post office. In such a case, I2 may attempt to redeposit the payment order through I4. Such unintentional double deposits, resulting from retransmission over an alternative path to recover from failures, are referred to herein as retry deposits. To allow retry deposits to be distinguished from intentional, fraudulent double deposits, I2 preferably indicates on the second deposit attempt, through I4, that this is a retry deposit following a failed attempt to deposit the payment order through I3. This indication is preferably added to the deposit trail, at a retry recording step 94. The retry deposit through I4 is then completed, at a retry step 96.

Returning now to the case in which peer $P_i$ is found at step 85 to be deposit target 26, the peer attempts to debit an account of payer 22 at debit step 95. Optionally, the deposit target may be programmed to recognize certain deposits as requiring notification to be given to a manager or other controlling entity, at a notification requirement step 97. Such notification will typically be required for particularly large debit amounts, for example. In such a case, the deposit target preferably sends a notification message to its management interface, at a management step 98, and may await instructions before proceeding. Otherwise, the deposit proceeds directly to a payment step 99, at which the deposit order is cleared or canceled as appropriate.

Figure 6:
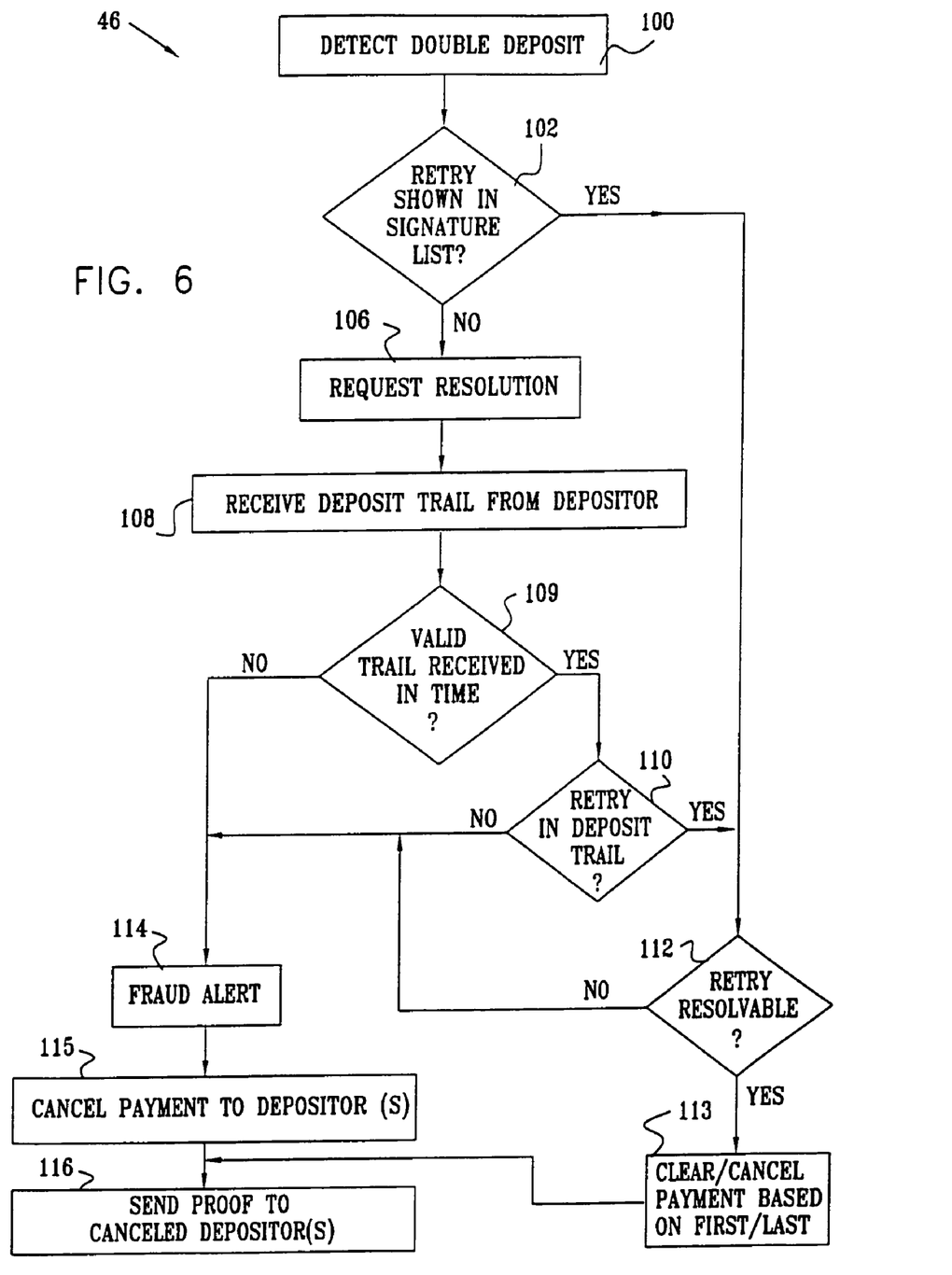
FIG. 6 is a flow chart that schematically illustrates a method for processing a double deposit of a payment order, in accordance with a preferred embodiment of the present invention.

FIG. 6 is a flow chart that schematically illustrates details of resolution step 46, in accordance with a preferred embodiment of the present invention. The deposit protocol preferably includes an agreed-upon process for handling a detected double deposit after the source is resolved. This process is invoked at a double deposit detection step 100. It should be understood that although the description hereinbelow refers to resolution of double deposits, these procedures and protocols may equally be applied to three or more simultaneous deposits of a given payment order.

As noted above, when one of the processors detects a double (or multiple) deposit, it attempts to examine the deposit trail of the payment order, at a list-checking step 102. If there is a deposit trail, and it includes a record of a retry, then the processor examines the retry record to determine whether the double deposit can be resolved, at a resolvability-checking step 112. If so, then the double deposit resulting from the retry is resolved, at a retry resolution step 113, using a simple convention to select the path to be paid. For example, either the first path attempted before the retry or the last path following the retry may be selected for payment in all cases. The clear/cancel protocol is used to cancel payments on the other path or paths. Preferably, the signed deposit trail from the path that was preferred is provided as proof of the legitimacy of the cancellation, at a proof step 116.

If there is no deposit trail, or only a partial trail, accompanying the payment order, it may not be possible to determine immediately whether the double deposit was innocent or fraudulent. In such a case, processor $P_i$, which received the questionable payment order, uses the resolution protocol to ask the depositing processor $P_j$ for additional details, at a resolution request step 106. $P_i$ sends $P_j$ an identification of the payment order being investigated and an indication of the problem. Optionally, $P_i$ may be required to include proof of the necessity of the resolution process, such as proof of a double deposit. $P_j$ must respond to this request within the maximal deposit resolution time, by submitting a validly-signed deposit trail for the payment order, at a deposit trail submission step 108. Alternatively, $P_j$ may agree that the deposit was wrong. It may also happen that $P_j$ cannot provide such a trail, despite being honest, if one of his clients committed a fraud, for example. In this case, too, $P_i$ can cancel the payment to $P_j$.

If processor $P_i$ does not receive a valid deposit trail within the specified resolution time, or if $P_j$ has admitted fault, at a trail reception step 109, then the processor is in a position to cancel payment. This might occur, for example, if a signature is missing from the deposit trail. If it is determined that a signature is missing in one (or both) of the deposit trails, then the payments over the corresponding path are cancelled. Preferably, processor $P_i$ issues a possible fraud alert via its management interface, at a fraud detection step 114. The processor then uses the clear/cancel protocol to cancel payment to any depositing processor that lacks a valid deposit trail, at a cancellation step 115. Most preferably, whenever a payment is cancelled, $P_i$ sends proof to the depositor of the reasons for the cancellation, at a proof step 116.

Alternatively, if valid trails are timely received at step 109, process $P_i$ checks whether the deposit trail is complete for both of the paths over which the deposit was received. If both signature trails are complete, however, then the trails are checked at a trail checking step 110 for indications of deposit retry attempts, as described above. Because retries are supposed to be indicated in the deposit trail, if retry indications are missing from both of the trails, it should be possible to prove that a double deposit was made maliciously. In this case, payments may be denied completely, or payment may be made through only one path if it is proved that the fraud occurred on the other path. Retry resolution at step 112 is preferably able to handle cases in which multiple innocent deposit retries were made by different processors along multiple paths.

Figure 7:
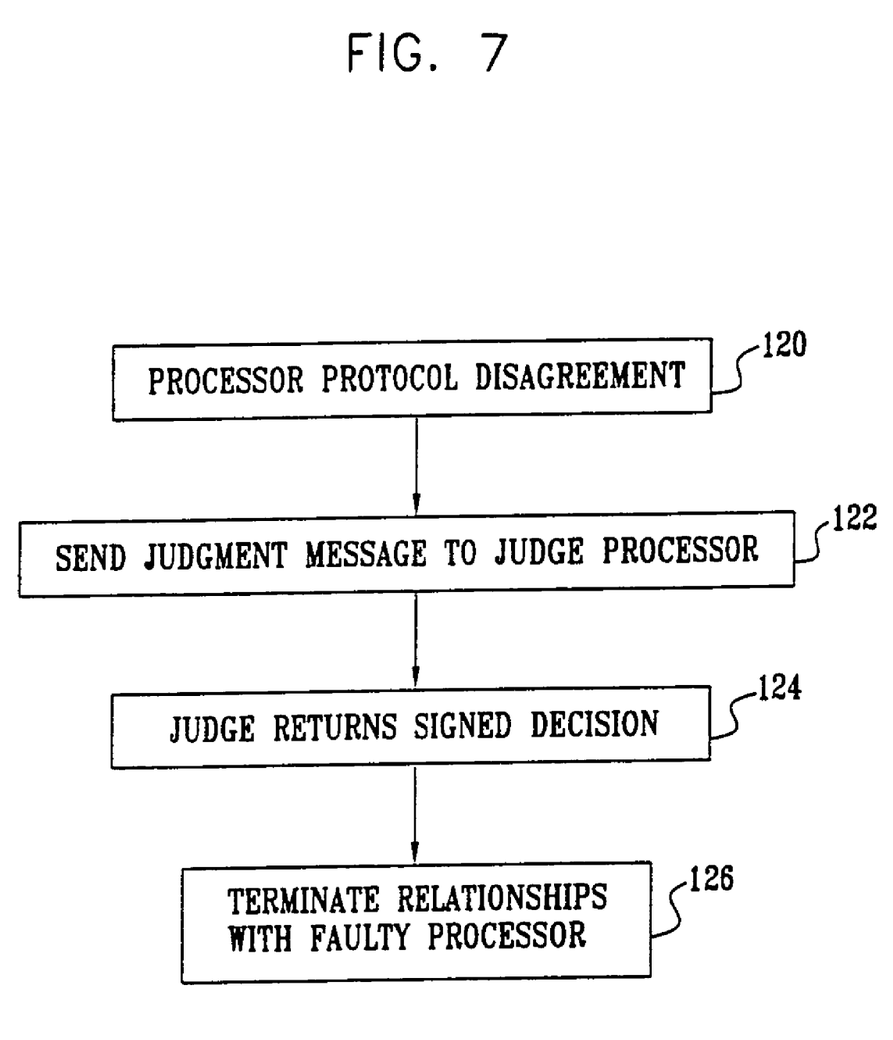
FIG. 7 is a flow chart that schematically illustrates a method for resolving conflicts among payment processors, in accordance with a preferred embodiment of the present invention.

FIG. 7 is a flow chart that schematically illustrates a method for resolution of conflicts among processors in network 20 using the judgment protocol, in accordance with a preferred embodiment of the present invention. This protocol is used when one of a pair of processors claims, at a disagreement step 120, that the other processor has failed to follow the correct protocol. The processor sends a special judgment message to one or more processors running a judgment process, at a messaging step 122. The judgment message must contain proof of the other processor's improper behavior. The judging processor or processors reply with a signed decision, at a judgment step 124. In addition to resolving the conflict at hand, the judgment may also dictate sanctions against the party that is in the wrong. For example, receipt of such signed a judgment decision may cause other processors to terminate their relationships with the suspected malfunctioning processor, at a termination step 126.

Although preferred embodiments are described hereinabove with reference to a particular network 20 and specified protocols used in the network, it will be apparent to those skilled in the art that the principles of the present invention may be applied in other contexts, as well, in which a chain of electronic transactions must be reliably documented. These principles may be applied, mutates mutandis, in substantially any commercial setting in which independent peer entities do business over a computer network. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor;

transferring payment from the first intermediary processor to the depositing processor responsive to the payment order; and verifying validity of the payment order responsive to the signed deposit trail, wherein verifying the validity of the payment order comprises, when two or more duplicates of the payment order are received at one of the processors, determining which of the copies is valid responsive to the signed deposit trail, and wherein determining which of the duplicates is valid comprises determining whether the duplicates were generated accidentally due to a communication failure.

2. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor;

transferring payment from the first intermediary processor to the depositing processor responsive to the payment order; and verifying validity of the payment order responsive to the signed deposit trail, wherein verifying the validity of the payment order comprises, when two or more duplicates of the payment order are received at one of the processors, determining which of the copies is valid responsive to the signed deposit trail, and wherein determining which of the copies is valid comprises requesting that each of the processors that conveyed one of the two or more duplicates of the payment order provide the signed deposit trail for the respective duplicate, and clearing or canceling each of the duplicates responsive to the deposit trails provided.

3. A method according to claim 2, wherein requesting that each of the processors provide the signed deposit trail comprises requiring that the processors provide the deposit trail within a specified time limit.

4. A method according to claim 3, wherein requiring that the processors provide the signed deposit trail within the specified time limit comprises transmitting a communication via an electronic post office within the specified time limit, whereby the post office returns a certification that the communication was conveyed within the specified time limit.

5. A method according to claim 4, wherein transmitting the communication via the electronic post office comprises sending the order to multiple post offices, thereby providing robust delivery of the order in the event of a failure associated with one or more of the post offices.

6. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor;

transferring payment from the first intermediary processor to the depositing processor responsive to the payment order; and verifying validity of the payment order responsive to the signed deposit trail, wherein verifying the validity of the payment order comprises clearing the order only if the deposit trail includes the electronic signatures of all of the intermediary processors that have conveyed the order.

7. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor; and transferring payment from the first intermediary processor to the depositing processor responsive to the payment order, wherein signing the payment order comprises grouping the payment order with other payment orders to be conveyed to the same deposit target processor, and applying a single signature to the grouped payment orders.

8. A method for deposit of an electronic payment order drawn on a deposit target processor comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor; and transferring payment from the first intermediary processor to the depositing processor responsive to the payment order, wherein conveying the signed payment order comprises awaiting an acknowledgment for a predetermined length of time after conveying the payment order to the second intermediary processor and, if the acknowledgment is not received, conveying the signed payment order to a third intermediary processor for conveyance of the payment order from the third intermediary processor over the network to the deposit target processor.

9. A method according to claim 8, wherein conveying the signed payment order to the third intermediary processor comprises adding to the payment order an indication by the first intermediary processor that it has conveyed the payment order twice, whereby the deposit target processor is able to resolve duplicates of the payment order received via the second and third intermediary processors.

10. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor; and transferring payment from the first intermediary processor to the depositing processor responsive to the payment order, wherein conveying the payment order comprises conveying the order via an electronic post office within a specified time limit, which post office returns to the first intermediary processor a certification that the order was conveyed to the second intermediary processor within the specified time limit.

11. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor;

transferring payment from the first intermediary processor to the depositing processor responsive to the payment order;

receiving at the first intermediary processor a routing message, the message identifying the deposit target processor and providing a respective secure identifier for the deposit target processor; and clearing the payment order at the first intermediary processor by checking the payment order against the secure identifier of the specified deposit target processor provided in the routing message.

12. A method according to claim 11, wherein the secure identifier comprises a public key of a respective electronic signature for each of the deposit target processors.

13. A method according to claim 11, wherein the first intermediary processor is one of a plurality of intermediary processors, which comprises the deposit target processor.

14. A method according to claim 11, wherein transferring the payment comprises transferring the payment to the depositing processor without waiting for a response from the deposit target processor to conveyance of the payment order thereto.

15. A method according to claim 14, and comprising receiving at the first intermediary processor, after clearing the order, an indication from the second intermediary processor that the payment order was not cleared by the deposit target processor, and canceling the payment responsive to the indication.

16. A method according to claim 11, wherein transferring the payment comprises transferring the payment after receiving an indication from the second intermediary processor that the payment order has been cleared.

17. A method according to claim 11, wherein conveying the signed payment order comprises selecting the second intermediary processor to which the payment order is conveyed from among a plurality of intermediary processors available to convey the payment order over the network to the deposit target.

18. A method according to claim 11, wherein conveying the signed payment order comprises conveying the order via an electronic post office within a specified time limit, which post office returns to the first intermediary processor a certification that the order was conveyed to the second intermediary processor within the specified time limit.

19. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor; and transferring payment from the first intermediary processor to the depositing processor responsive to the payment order, wherein conveying the signed payment order comprises selecting the second intermediary processor to which the payment order from among a plurality of intermediary processors available to convey the payment order over the network to the deposit target processor, and wherein conveying the signed payment order comprises receiving notifications from the plurality of available intermediary processors indicative of different transaction terms respectively offered by the available intermediary processors to the first intermediary processor, and selecting the intermediary processor to which to convey the order responsive to the offered terms.

20. A method according to claim 19, wherein the offered terms comprise rates at which the available intermediary processors are to be compensated for conveyance of the payment order.

21. A method according to claim 19, wherein the offered terms comprise lengths of time required by the available intermediary processors for processing of the payment order.

22. A method according to claim 19, wherein the offered terms comprise maximal outstanding debt limits offered by the available intermediary processors to the first intermediary processor.

23. A method according to claim 19, wherein the deposit target processor is one of a plurality of deposit target processors accessible via the network, and wherein the offered terms comprise different terms specific to each of the deposit target processors.

24. A method according to claim 23, wherein receiving the notifications comprises receiving a routing message from each of the plurality of intermediary processors indicating the deposit target processors accessible through the intermediary processor and the specific terms respective to each of the deposit target processors.

25. A method according to claim 19, wherein receiving the notifications comprises receiving messages from different ones of the available intermediary processors intermittently, altering the transaction terms offered to the first intermediary processor.

26. A method for deposit of an electronic payment order drawn on a deposit target processor, comprising:

receiving the electronic payment order at a first intermediary processor over a network from a depositing processor;

signing the payment order with an electronic signature of the first intermediary processor;

conveying the signed payment order over the network from the first intermediary processor to at least a second intermediary processor;

adding to the signed payment order an electronic signature of at least the second intermediary processor so as to generate a signed deposit trail;

conveying the payment order with the signed deposit trail from the second intermediary processor over the network to the deposit target processor; and transferring payment from the first intermediary processor to the depositing processor responsive to the payment order, wherein conveying the signed payment order comprises selecting the second intermediary processor to which the payment order from among a plurality of intermediary processors available to convey the payment order over the network to the deposit target processor, wherein conveying the signed payment order comprises receiving notifications from the plurality of available intermediary processors indicative of different transaction terms respectively offered by the available intermediary processors to the first intermediary processor, and selecting the intermediary processor to which to convey the order responsive to the offered terms, and wherein conveying the signed payment order comprises conveying the order in accordance with peer-to-peer contracts between the first intermediary processor and each of the plurality of available intermediary processors, specifying terms under which the payment order is to be conveyed.

27. A method according to claim 26, wherein the peer-to-peer contracts are negotiated between the intermediary processors, such that a new intermediary processor is able to join the network substantially without prior audit by a central authority.

* * * * *